Jan. 29, 1963 L. A. MEACHAM ET AL 3,076,059

SIGNALING SYSTEM

Filed June 20, 1958 4 Sheets-Sheet 1

INVENTORS L. A. MEACHAM
L. SCHENKER

BY John E. Wagner

ATTORNEY

Jan. 29, 1963 L. A. MEACHAM ET AL 3,076,059

SIGNALING SYSTEM

Filed June 20, 1958 4 Sheets-Sheet 2

INVENTORS L. A. MEACHAM
L. SCHENKER

BY John E. Wagner
ATTORNEY

Jan. 29, 1963 L. A. MEACHAM ET AL 3,076,059

SIGNALING SYSTEM

Filed June 20, 1958 4 Sheets-Sheet 3

INVENTORS L. A. MEACHAM
L. SCHENKER

BY John E. Wagner
ATTORNEY

INVENTORS L. A. MEACHAM
L. SCHENKER
BY John E. Wagner
ATTORNEY

United States Patent Office 3,076,059
Patented Jan. 29, 1963

3,076,059
SIGNALING SYSTEM

Larned A. Meacham, New Providence, and Leo Schenker, Berkeley Heights, N.J., assignors to Bell Telephone Laboratories, Incorporated, New York, N.Y., a corporation of New York Filed June 20, 1958, Ser. No. 743,434
13 Claims. (Cl. 179—84)

This invention relates to signaling systems and more particularly to such systems in which information may be transmitted in the form of bursts of predetermined voice frequencies, for example in telephone subscribed signaling systems.

Voice frequency subscriber signaling offers many attractive advantages over the customary interrupted direct current methods heretofore employed. For example, it affords the use of the same channel for signaling as for voice transmission and allows the use of pushbutton dialing with assets of speed, reliability, convenience and simplicity of design.

Attendant with these advantages of voice frequency signaliing is the ever present problem of the need for the signaling system to discriminate between valid signals and noise or speech energy also appearing on the line. Several proposals have been made heretofore relating to the prevention of interference by speech currents or noise. Such prevention shall hereinafter be referred to as talkoff protection since the objective is to protect the digit receiver from being set off or made operative due to talking or other non-signaling currents on the telephone line. Of the proposals made, the talkoff protection offered is almost universally of statistical nature in that the signal receiver is designed to detect signals having characteristics which are statistically unlikely to exist in speech or noise currents. For example, it has been proposed that such receivers include sharply tuned bandpass filters and amplitude gates so that the receiver will register a digit or valid signal only when there is energy above a predetermined minimum level in the narrow signaling band. Another proposal is to employ the same elements as above but adding a guard channel outside of the signaling channel but within the band of interfering currents and disable the receiver if an appreciable amount of energy lies in the guard channel, i.e., there is speech present on the line. The statistical reliability of such systems may be improved by the requirement that a valid signal be made up of two frequency components often transmitted with a predetermined time differential therebetween. All of such systems heretofore as they approach increased statistical reliability are also characterized by increased complexity and cost. For example, in the last described proposal the signal receiver must examine incoming energy for frequency content and time intervals as well.

It is therefore a general object of this invention to enhance reliability of multifrequency signaling systems.

Another object of this invention is to obtain such reliability in a system of comparative simplicity and low cost that it may be practically utilized in telephone subscriber signaling systems.

Still another object of this invention is to improve the statistical reliability of multifrequency signaling systems without any increase in the number of signal-identifying characteristics.

These objects are accomplished in accordance with this invention, one embodiment of which comprises a signal transmitter designed to generate two frequencies, each from a different band within the voice spectrum identified for convenience as the A and B bands. Connected to the signal generator over the same path as used for speech transmission in a telephone central office is a signal receiver comprising a pair of band elimination filters which segregate and eliminate the B and A bands, respectively, each from the remaining voice spectrum including the other band and thereby define two channels, termed the A and B channels in reference to the included bands. The output of the A channel band elimination filter, i.e., the A band and the entire voice spectrum received except the B band, is introduced into an extreme instantaneous limiter. The limiter not only limits the amplitude of the signal but also, through the phenomenon of "limiter capture," produces an output no major fraction of which can be devoted to any single frequency component unless that component is predominant over all others in the limiter input.

The limiter is connected to a plurality of selective circuits or filters which pass the individual signaling frequencies and reject all others. The selective circuits are all connected to respective registering devices which may utilize a relay for each circuit operated in the presence of the particular resonant frequency of the filter circuit. The B channel band elimination filter which passes band B and the entire speech spectrum except band A similarly is connected to another extreme instantaneous limiter which in turn is followed by selective circuits for the band B signaling frequencies. The selective circuits are followed by respective registering devices similar to those in the A channel. A utilization device or recorder may be included with the receiver which recognizes coincident outputs of the A and B filters or registering devices.

In another embodiment of this invention the receiver includes an equalizer which enhances the level of energy at all frequencies in the voice band outside of the A and B signaling bands and in doing so improves the statistical reliability of the system.

One broad feature of this invention relates to the use of a signal generator which produces signal components for transmission, reception and detection which components have differentiable characteristics and which are divisible into groups likewise having differentiable characteristics.

Another feature of this invention involves the presence of a signal receiver which segregates the components of valid signals into a plurality of groups, analyzes the content of each group for the presence of one and only one signal component and recognizes coincident outputs as a complete signal.

Another feature of this invention resides in the signal receiving segregation networks which separate the groups of signal components from each other while passing interference along with the groups ultimately to afford protection from the interference.

Another feature of this invention results from the use of a simple amplitude limiter to suppress any but a dominant-single-frequency component of the receiver energy to be examined for signal content.

Still another feature of this invention resides in the connection of the amplitude limiter to signal selective networks whereby a dominant single frequency passed by the limiter is examined for signal content.

And still another feature of this invention is based upon the fact that the signal receiver includes means for combining the outputs of the signal selective networks to allow the registration of a complete valid signal.

These and other features of this invention may be understood from the following detailed description and by reference to the accompanying drawing in which:

FIGS. 1, 2 and 3 comprise an electrical schematic diagram of the signaling system of this invention;

Figure 1:
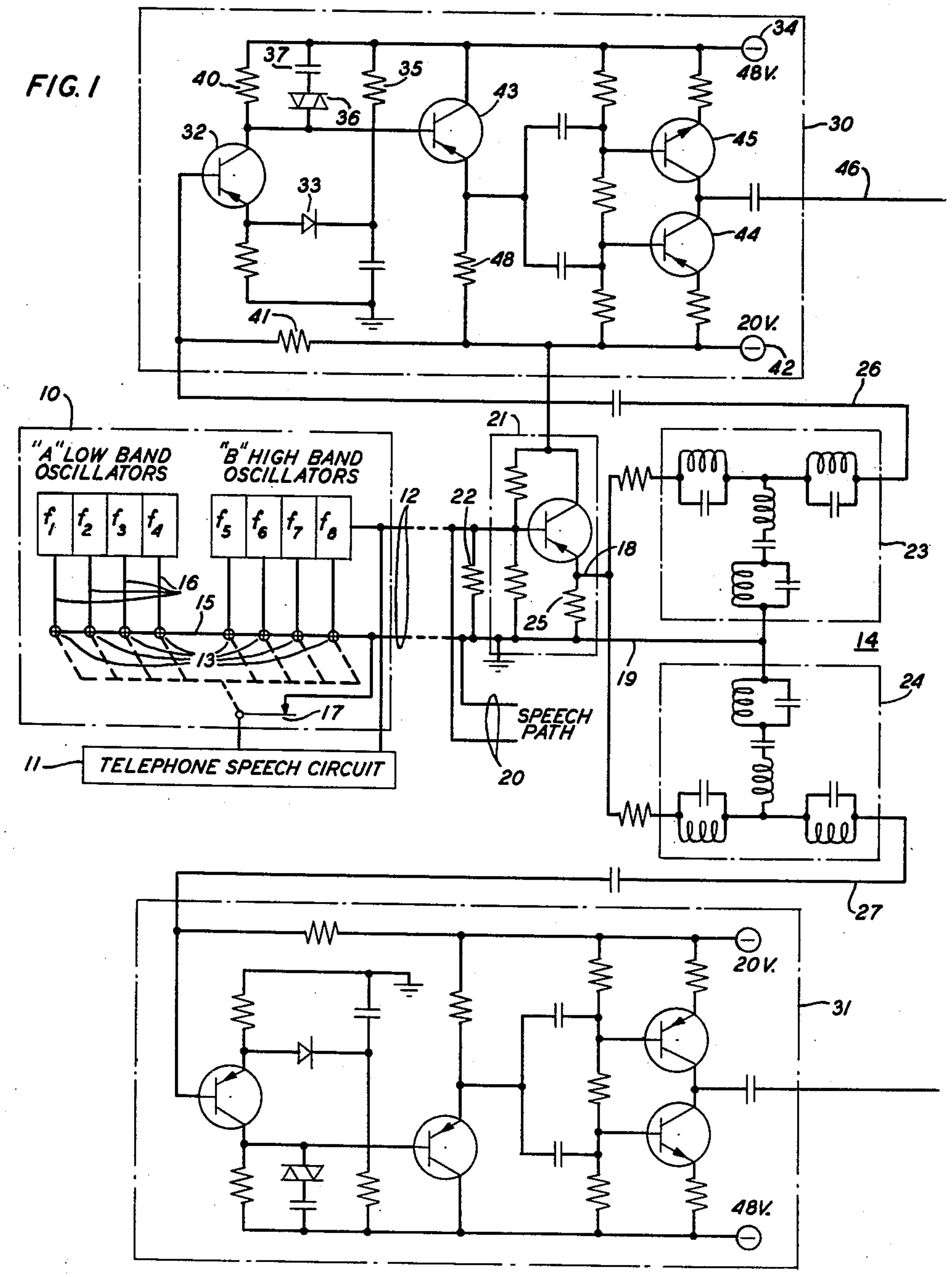
Figure 2:
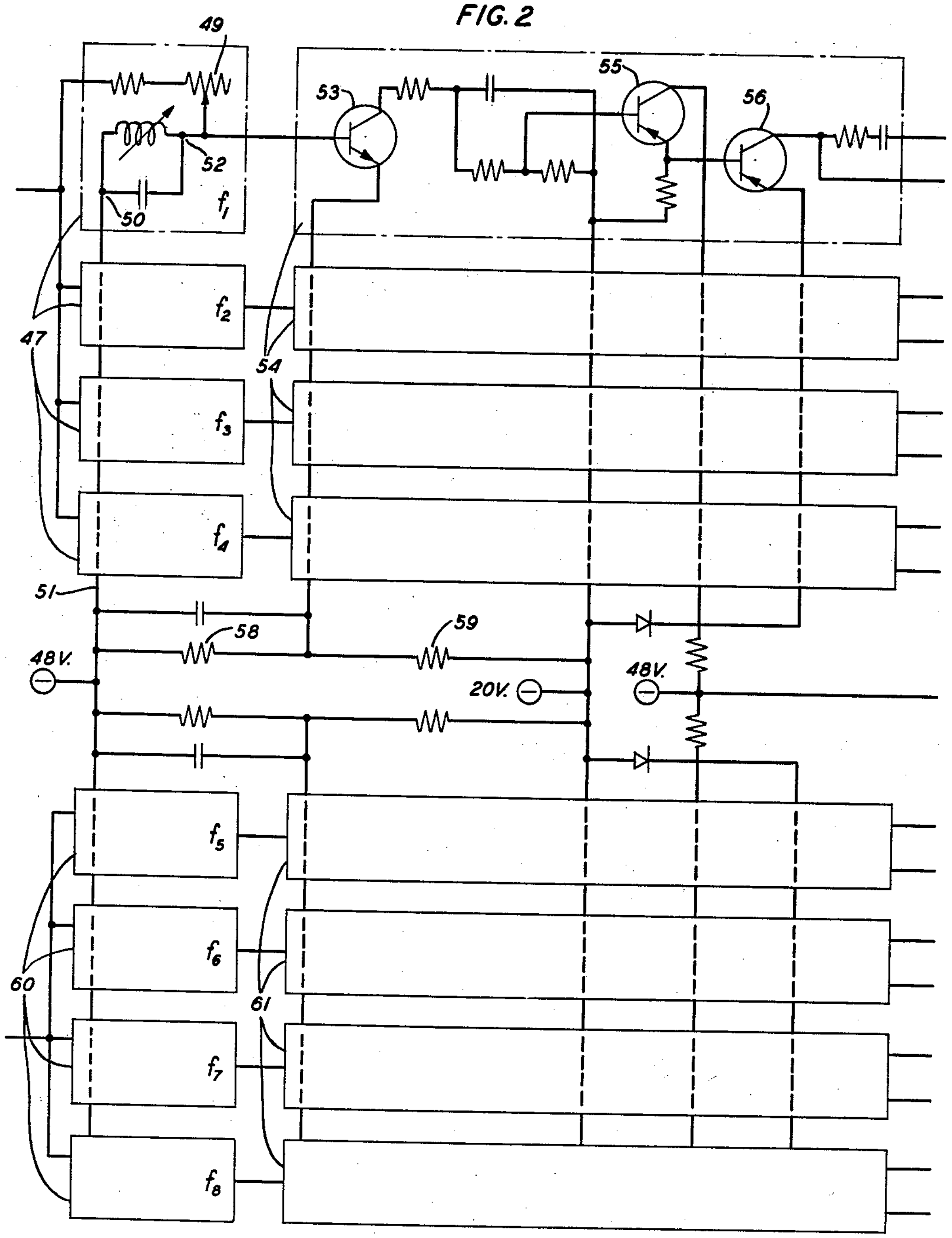
Figure 3:
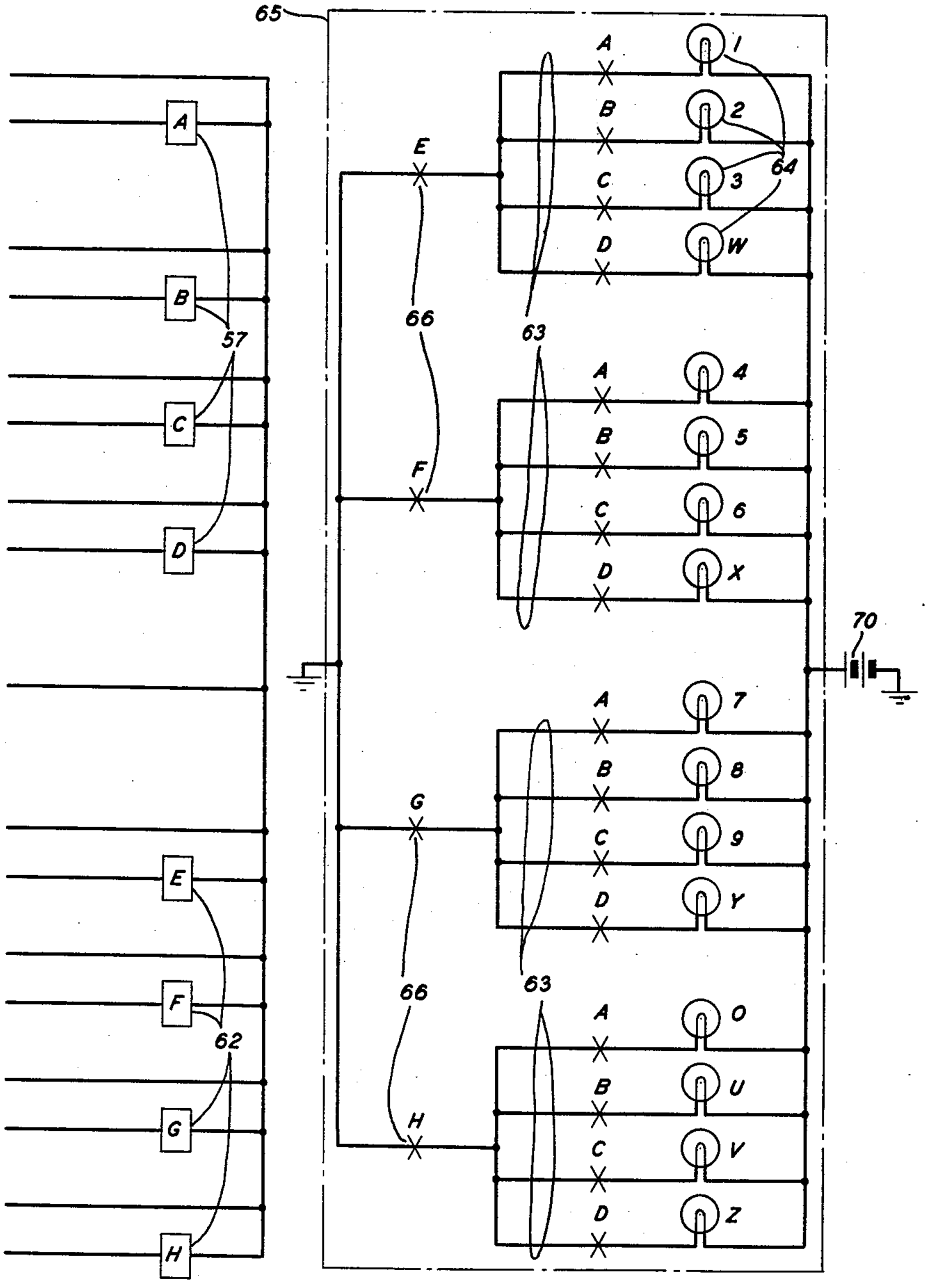

Referring now to the drawing in FIG. 1 a signaling system of this invention may be seen comprising a signal transmitter 10 and a telephone speech circuit 11 connected in parallel across a telephone line 12. The speech circuit 11 may be of conventional type and therefore is shown only in block form. The signal transmitter 10 is shown as eight individual oscillators, four operating at discrete frequencies which may be in the range of 650 to 1000 cycles per second and four operating at discrete frequencies which may be in the range of 1000 to1500 cycles per second all well within the voice frequency band for telephone transmission. The signal transmitter 10 includes controls, preferably pushbutton-actuated contacts 13, for connecting the oscillators for transmission of oscillatory waves over the line 12 to a signal receiver constituting the remaining elements of FIG. 1 and all of FIGS. 2 and 3. The pushbutton-actuated contacts 13 are indicated by a dotted line as mechanically ganged together so that depression of one button closes the circuit between the horizontal or common conductor 15 and one vertical or individual conductor 16 associated with the low or A band oscillators, closes a similar circuit of the high or B band oscillators, and opens contacts 17 of the speech circuit. The output of one oscillator of each band is thus coupled directly to the line 12 whereby the composite signal is transmitted to the signal receiver 14 which in typical applications is the digit signal receiver in a telephone central office. The speech circuit 11 is similarly connected via the telephone line 12 to a telephone central office including a speech transmission path, the latter indicated by the pair of conductors 20.

The signal transmitter 10 preferably employs the multifrequency transistor oscillator of the copending application L. A. Meacham-F. West Serial No. 759,474 filed September 8, 1958 and the crosspoint switch of the copending application of C. E. Mitchell Serial No. 768,737 filed October 21, 1958, issued on May 15, 1962 as United States Patent 3,035,211.

The signal receiver 14 includes as an input stage a transistor emitter follower 21 bridged by a resistor 22. The resistor 22 provides impedance matching to the line 12 having a characteristic impedance in the order of 900 ohms and the output of the transistor emitter follower 21 through leads 18 and 19 provides impedance matching and isolation of a pair of band elimination filters 23 and 24 each connected across the emitter resistor 25. The band elimination filters 23 and 24 are typically identical in circuit configuration but different from each other in component values. Each series arm of the T-type filters shown comprises a parallel inductor-capacitor combination. The shunt arm includes a serially connected inductor, capacitor and an impedance comprising a parallel inductor and capacitor. The A band filter 23 provides an insertion loss of in the order of 30 decibels in the B band frequency range, e.g., 1000 to 1500 cycles per second, while the B band filter introduces similar attenuation into the A band. The filters 23 and 24 provide segregation of the two signaling bands from each other but do not eliminate any of the remainder of the transmitted spectrum to insure reliability as is hereinafter explained.

The output leads 26 and 27 of the band elimination filters are each connected to respective limiters 30 and 31 which provide complete amplitude limiting over a broad range of input levels; for example, one millivolt to one volt. The limiter 30 thus connected to the band elimination filter 23 constitutes the first element of the low or A frequency signaling channel. The limiter 30 comprises a first stage of amplification coupled through an impedance transforming stage to a complementary symmetry or push-pull output stage of amplification. The first stage which provides preliminary limiting for high level signals and low distortion amplification of low level signals includes a p-n-p type transistor 32 connected in a common emitter circuit configuration including diode 33 connected between the emitter circuit and a negative forty-eight volt supply 34 through a dropping resistor 35 bypassed to ground by a large capacitor and also including a pair of oppositely poled parallel connected diodes 36 in series with a direct current isolating capacitor 37 both across a collector resistor 40 for limiting excursions of the collector voltage. In a typical embodiment the transistor is a General Electric 2N43 type with a collector supply 34 in the order of minus forty-eight volts and base bias furnished through a resistor 41 connected to a minus twenty volt supply 42. Proportions are such that the emitter current of transistor 32 is equal to the current through resistor 35. Employing such an input stage, the collector current varies in presence of a high level signal from zero to twice its quiescent value in an almost square wave output. Resistor 40 has high resistance and would produce a correspondingly large voltage, were it not for the diodes 36 which preserve high gain at small amplitudes, but limit voltage swings of the collector to 1.2 volts peak-to-peak. Such voltage limiting avoids disturbance of biases by excessive overload of following transistors, and thus insures a symmetrical output regardless of the input level in its operating range.

For a more complete understanding of the operation of transistor amplifiers of the type constituting the first stage of the limiter 30, reference may be had to the application, Serial No. 574,714 filed March 29, 1956, issued on September 2, 1958 as U.S. Patent 2,850,650 of the coinventor, L. A. Meacham.

The collector of the transistor 32 is directly coupled to the base of a transistor 43 operating as an emitter follower or impedance transformer with collector connected directly to the negative forty-eight volt supply 34 and emitter to the minus twenty volt supply 42 through a dropping resistor 48. The transistor 43 provides an impedance reduction from collector of the transistor 32 by a factor equal to $1-\alpha$ where $\alpha$ of the transistor 43 is in the order of 0.98. Coupled to the emitter of the impedance transforming stage are a pair of transistors 44 and 45 of complementary type as a push-pull output stage. Utilizing the opposite types in which the transistor 44 is of the p-n-p variety, for example, a General Electric 2N43 type, and the transistor 45 is an n-p-n unit such as a 2N167 of the same manufacturer, the transistors will conduct alternately, each almost instantaneously becoming saturated while the other becomes non-conducting, so that the common output lead 46 conducts a series of square pulses with axis crossings corresponding to those of the input applied to the limiter 30. If one frequency component of the input signal is stronger than all others combined, the mean fundamental frequency of the square wave is equal to the frequency of that component; i.e., the limiter stage at any instant is captured by the highest level signal and produces an output containing, as the fundamental, predominantly a frequency of the highest level input signal.

The output of the limiter 30 is coupled through level control rheostats 49, one of which is shown, to four selective circuits each comprising sharply tuned bandpass filters 47 constituting simple anti-resonant parallel inductor-capacitor networks. Each of the four filters 47 is tuned to a particular A band signaling frequency. The filters 47 include one terminal 50 connected to a negative supply lead 51 and a second terminal 52 to the base of a transistor 53 constituting a Class C first stage of a power amplifier 54. The emitter of transistor 53 is biased positively with respect to the base by means of a voltage divider comprising resistors 58 and 59, thus causing the collector to be nonconducting unless the output on conductor 52 from the associated selective circuit has a level exceeding a certain threshold value; i.e., an amplitude exceeding the said bias. Additional stages including transistors 55 and 56 provide a unidirectional output current of sufficient magnitude when the input threshold is exceeded for a reasonable duration to operate registering devices or relays 57 of FIG. 3.

Figure 7:
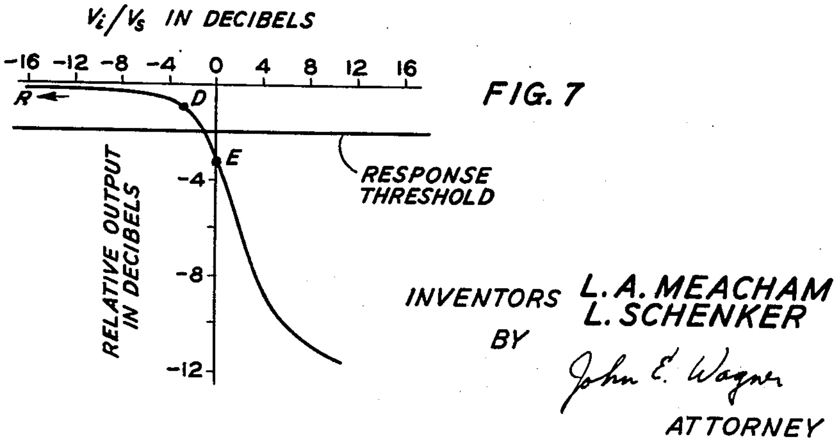
FIG. 7 is a graphical representation of the input-output characteristic of a limiter of FIG. 1 in combination with a frequency selective circuit of FIG. 2.

The overall input-output characteristic of the limiter 30 and one of the selective circuits 47 with any absolute level of signal and varying values of signal-to-interference ratio at the limiter input may be seen in FIG. 7. Therein is shown a graphical representation of the ratio of the interference $V_i$ to the signal $V_s$ in decibels on the abscissa scale and the relative level of output of the particular selective circuit 47 to which the frequency of $V_s$ corresponds on the ordinate scale also in decibels. By way of reference a pure signal without interference, represented by the letter R on the curve, gives the maximum possible response of the selective circuit. If in contrast the interference is equal in level to the signal ($V_i/V_s=0$ db) the output (Point E) is reduced by approximately three decibels below the reference; or again if the interference is smaller than the signal by three decibels ($V_i/V_s=-3$ db) the output is reduced by only one decibel below the reference as shown by Point D. In a practical system for subscriber signaling in which the minimum signal-to-noise ratio is in the order of five decibels, registering device 57 following the selective circuits 47 can have its threshold correspond to an output level of about minus two decibels on the ordinate scale because all valid signals will have an output level substantially exceeding such a threshold. Establishment of a high threshold for the registering device has an important advantage in preventing the spilling over of valid signals into adjacent channels and exciting their registering devices as well.

Each frequency selective network 47 is connected to a similar power amplifier 54 and relay 57 labeled A, B, C and D so that under the conditions that the limiter 30 is captured by any of the A band frequencies identified as *f*1, *f*2, *f*3 and *f*4, the respective relay A, B, C or D is operated.

The band elimination filter 24 of the B channel which eliminates only the A frequency signaling band is coupled to an identical limiter 31 which in turn is connected to B band frequency selective networks 60 similar to the A band narrow bandpass filters 47. The outputs of the B band filters 60 are connected to power amplifier stages 61 and relays 62 labeled individually as E, F, G and H. The contacts of the A and B band relays 57 and 62, shown in detached form for sake of clarity, are connected in logical order so that sixteen combinations of two operated relays, one in each channel, are indicative of sixteen types of information, e.g., code characters or digits. This recombination or synthesis of the signal components is accomplished by a network 65 including four normally open contacts 66, one on each B band relay 62, each of these contacts being in series with four paths 63 and each such path including a normally open contact associated with one of the A band relays 57. Sixteen lamps 64 identified by the digits 1 through 0 and letters U through Z are connected to be powered by a battery 70 upon the simultaneous closure of one set of A band and one set of B band relay contacts. The lamps 64 are representative of a utilization circuit in a telephone central office.

From the above description, it should be readily apparent how a pair of valid signal frequencies from the signal generator 10, transmitted over the telephone line 12 are received, segregated, detected and registered by the central office receiver. The design of a central office receiver which is responsive to all valid signals is facilitated if the selective circuits have broad selectivity and the registering devices high sensitivity. However, as such sensitivity is increased and selectivity broadened, the likelihood of registration of false signals as valid ones increases and becomes the determining factor in reliability of the system. It is therefore essential that the system of this invention reliably discriminates between valid signals and interference containing frequencies that may match those of valid signals.

Inasmuch as the telephone speech circuit 11, including the transmitter, is connected to the line during nonsignaling periods, for example between lifting of the telephone hand set and the initiation of pushbutton signaling, the receiver is subjected to voice or noise energy on the line introduced through the transmitter. Taking first the case where the central office receiver is connected to the line and the telephone speech circuit is not disabled, speech or noise at the transmitter may contain energy in either or both of the A and B bands. Such energy received at the central office is segregated by the A channel band elimination filter 23 and the B channel band elimination filter 24 and introduced into the respective instantaneous limiters 30 and 31. As described above, the limiter 30, being what is termed an "extreme limiter" may be captured by an input frequency, but only if one is dominant over the entire speech spectrum except for the B band. If no such dominant frequency exists, the output of the limiter 30 is dispersed among the various components. The output of the limiter 30 on lead 46 contains only enough total energy so that if it is captured at a signal frequency for a sufficient duration, it can cause one selective circuit 47 to supply sufficient voltage with a small margin to the base of the transistor 53 or its counterpart in the set of power amplifiers 54 to operate one of the signal relays 57. That is, in order for one of two coincident conditions, the operation of one of the relays 57, to occur, the input of the limiter 30 must be predominantly at one and one only of the frequencies F1, F2, F3 or F4, as determined by the selective networks 47.

Similarly, the energy passed by the band elimination filter 24 and introduced into extreme limiter 31 has to contain energy predominantly at one of the frequencies F5, F6, F7 and F8 of frequency selective network 60 to supply the second coincident condition, that is, operation of one of the relays 62. The probability that the speech or noise contains the two predominant frequencies simultaneously approaches the infinitesimal.

Given the case where the signal receiver detects one signal frequency occurring in noise or speech which in fact predominates over the remaining voice spectrum, one of the relays in the appropriate A or B band would be operated. However, in the absence of two such coincident conditions of predominance by two signal frequencies in their respective bands, no signal would be registered.

In both the A and B channels, the power amplifiers 54 and 61 need have only low sensitivity or, in other words, a predetermined high threshold, which is a direct function of the constant amplitude output of the limiters 30 and 31. The selectivity and sensitivity of the selected networks, power amplifiers and registering devices is not determined by the absolute range of levels of valid signals which may be received. The input to this portion of the receiver from the limiters is instead a function of the incoming signal-to-noise ratio. This characteristic of the system is extremely advantageous since it avoids the danger that strong high level valid signals or noise might contain sufficient energy to "spill over" or actuate two or more relays in the same channel which would produce an ambiguity.

Figures 4, 5, 6:
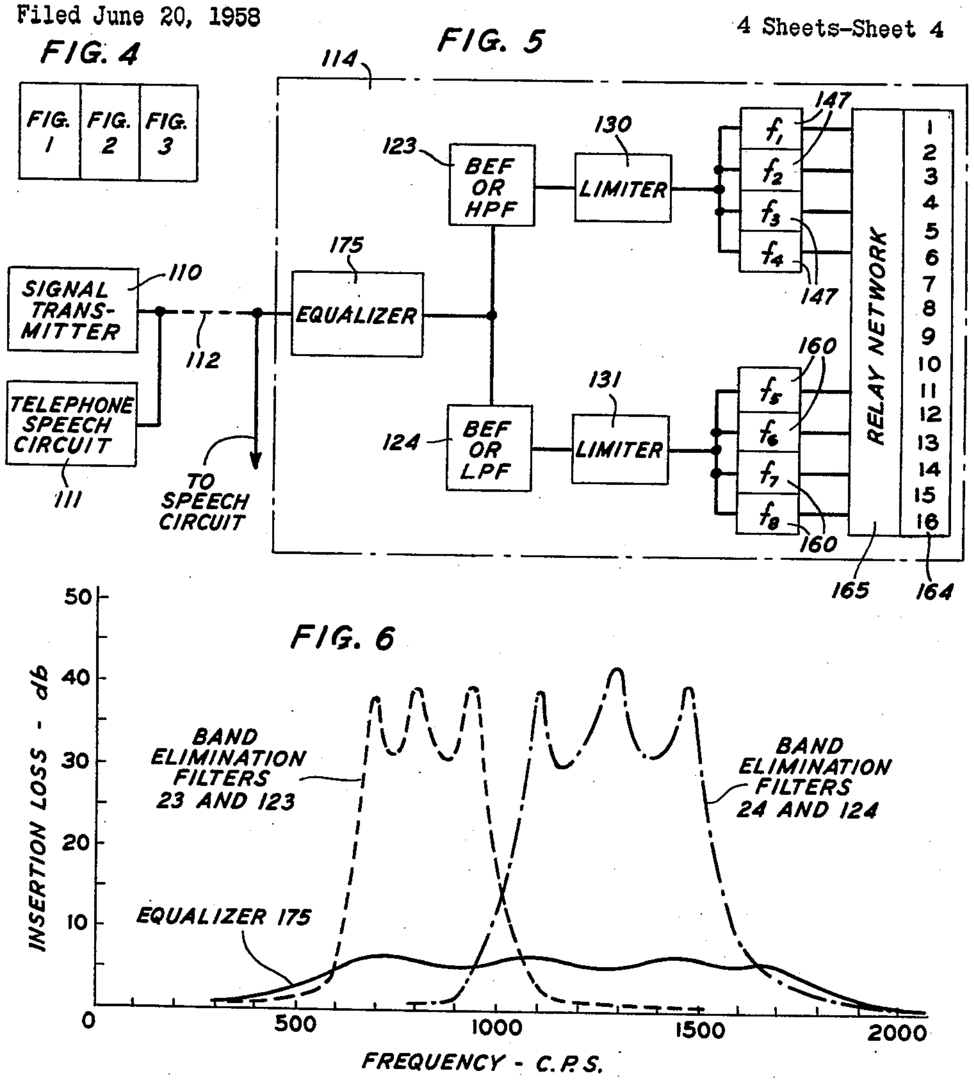
FIG. 4 is a representation of the arrangement of FIGS. 1, 2 and 3.
FIG. 5 is a block diagram of another embodiment of this invention in which transmission equalization is included.
FIG. 6 is a graphical showing of the frequency-loss characteristics of certain components of the system of FIGS. 1, 2, 3 and 5.

The reliability of the above-described system may be improved even more by employing the modified embodiment appearing in FIG. 5. The system is identical with that of FIGS. 1, 2 and 3 including a signal transmitter 110 associated with a telephone speech circuit 111 and connected through an appropriate transmission medium such as a telephone line 112 to a signal receiver 114. The receiver 114 in addition to filters 123 and 124 preferably of the band elimination type for the A and B bands, respective limiters 130 and 131, bandpass filters 147 and 160, relay network 165 and utilization or display device 164 includes a transmission equalizer 175 which introduces loss into the frequency range including the signaling bands A and B. The purpose of the equalizer is to enhance the relative level of the energy outside of the signaling bands; e.g., components of speech or interference outside the A and B bands with respect to those inside these bands. The reception of bona fide signals would not be affected, provided the attenuation introduced into the signal does not increase the noise-to-signal ratio above the maximum permissible for signal recognition by the receiver; e.g., in the order of about minus six decibels. Normally a suitably small ratio is easily maintained, as for example, when the level of interference is fifteen decibels or more below the valid signal level, the presence of such an equalizer 175 which introduces in the order of six to eight decibels of loss does not affect the detection of a valid signal. In the absence of a valid signal the equalizer 175 offers the advantage of further reducing the probability that the limiter stages 130 and 131 will be captured by components of interference inside of the signaling bands and therefore the narrow bandpass filters 147 and 160 will pass less than the level required to reach the threshold of operation of the power amplifier and relay network 165. This modification of the signaling system by an increase in the noise-to-signal ratio actually achieves greater reliability in signaling since a further limitation is imposed upon the nature of any interference which might cause the registration of a signal or digit when no valid signal exists. With the addition of the equalizer 175, interfering noise can only register a digit if it contains two signaling frequencies simultaneously and if each of them exceeds in level all other components of the interference by the amount of the attenuation of the equalizer 175 plus the signal-to-noise ratio corresponding to the detection threshold of the power amplifiers of the receiver 114; in the example given, above a total of twelve to fourteen decibels. Furthermore, due to the inherent operating delay of the relays in the network 165 and the narrow bandpass filters 147 and 160, the signaling frequencies must so predominate for a substantial length of time; for example, thirty to forty milliseconds. The probability of such an occurrence is appreciably less than without the equalizer 175. The insertion loss characteristics of the equalizer 175 may be seen in FIG. 6 superimposed upon the loss characteristics of the band elimination filters 123 and 124 of the A and B channels.

The reliability of the proposed system is achieved in large part by the advantageous arrangement or order of the components making up the system. For example, the separation of groups of frequencies by the band elimination filters 23 and 24 prior to nonlinear amplification eliminates the generation of intermodulation products of the A and B band signal components. Furthermore, the separation of the groups beforehand allows the limiting of each of the signal components separately to enhance their relative levels. Likewise, segregation followed by amplitude regulation of the separate groups means that any difference of received level of component signal frequencies is of no significance, since the output of each limiter is constant regardless of the level of input. The sensitivity or threshold of the registering devices, as mentioned above, is therefore a function of the fixed, predetermined output level of the limiters, which output is a function only of the signal-to-noise ratio of the component signal frequencies. The frequency selective networks therefore need not afford high discrimination, and may be of simple design as is disclosed herein, i.e., simple parallel capacitance-inductance tuned circuits.

This advantageous relationship of the signal to noise ratio to the output power of the selective circuits may be seen from the following tabulation taken from FIG. 7.

Assuming the power output of the selective circuits subject to a pure signal to be equal to a constant K the output under varying conditions may be expressed as a function of that value K;

| Signal to noise ratio $V_s/V_1$, db: | Output power, db |
|---|---|
| $\infty$ | K |
| 8 | K–0.5 |
| 4 | K–1 |
| 2 | K–1.5 |
| 0 | K–3 |

Over and above these advantages residing in the relative position of the segregating networks and the limiters is the advantageous utilization of the limiter whereby it provides three additional important functions in addition to the well known characteristics of automatic amplitude regulation:

(1) In the presence of a predominant frequency at its input it enhances the relative level of that frequency at its output;

(2) It inherently provides a form of guard action in preventing registration of a frequency simulating a signal if the frequency is accompanied by sufficient energy elsewhere in the speech spectrum; and (3) The plurality of limiters act to impose the logic requirement of, for example, two and only two dominant frequencies constituting a valid signal.

The embodiments of this invention described above are directed primarily to telephone subscriber call transmission. The application of the system, however, is not limited to this aspect of telephony nor to telephony in general. It finds application in systems wherever each element of information sought is coded and transmitted as a plurality of discrete components each of which must be received and synthesized or recombined to indicate the information transmitted. Such systems provide the statistical advantage that the likelihood of interfering noise producing all components is appreciably less than would be the case for a single component. This invention provides enhanced statistical reliability without the transmission of additional components of the signal and without the examination of the received components for any more than one characteristic, in this case frequency. To further amplify this broader aspect of the invention, reference again to the telephone application is desirable. As shown, a signal comprises two frequency components which must be detected and recombined at the receiver to produce a complete item of information, e.g., a dialed digit. The components of the signal are of differentiable characteristic, to wit, of different frequency. However, by the imposition of a restriction upon the choice of frequencies such that the signal components or frequencies are separable into groups which groups likewise have a differentiable characteristic, enhanced statistical reliability is obtained. In the embodiment shown not only must two frequencies be received at the receiver and detected but the two frequencies each must fall into a preassigned group and predominate in magnitude over all received frequencies except those of the other group or groups.

From a mathematical viewpoint this invention involves a system for generating and detecting signals made up of $n$ components of $m$ available, divided into $n$ groups composed of $m_1, m_2, m_3, \ldots m_n$ components respectively so that $m=m_1+m_2+m_3+ \ldots m_n$. Then the number N of combinations of signals which may be generated is:

$$N=(m_1)(m_2)(m_3) \ldots (m_n) \quad (1)$$

Specifically, if the size of each group is equal, $$m_1=m_2= \ldots m_n$$

then $$m=nm_1 \quad (2)$$

and $$N=\left(\frac{m}{n}\right)^n \qquad (3)$$

In the proposed system described above $$m=8;\ n=2;\ m_1=m_2=4$$

and $$N=\left(\frac{8}{2}\right)^2=16 \qquad (4)$$

The number N is less than that of a simply restricted code in which $n$ components are always selected out of a group $m$ represented as $$N=\frac{m!}{n!(m-n)!} \qquad (5)$$

or the unrestricted code in which any number of components $n$ of the group $m$ may be used to form a complete signal where $$N=2^m$$

In the former code where $n$ equals 2 and $m$ equals 8

$$N=\frac{8!}{2!(6)!}=28 \qquad (6)$$

and in the latter where $m$ again equals 8

$$N=2^8=256$$

However, it is well known that signaling speed and bandwidth may be exchanged for reliability, and in some signaling systems, such as that used in establishing a telephone call, the transmission channel has more than enough bandwidth to handle the speeds required. Hence, the loss of twelve possibilities as compared with the less restricted code and 240 as compared with the unrestricted code is of little or no significance, and is a reasonable price to pay for an increase in reliability.

In the instrumentation of such a system, the fact that both $m_n$ and $n_n$ are in the same domain, frequency, means that the same criterion is used in segregating the $n$ groups as is subsequently used in identifying the $m$ components. Moreover, in such a system in which the signal components are transmitted simultaneously the segregation of the component groups allows the use of a multiplicity of limiters each of which determines a maximum amplitude of each signal component individually. The individual limiters for individual signal components each provide a relatively narrow range of amplitudes for valid signal components. Consequently the narrow bandpass filters need not have high discrimination and the relay networks need not have low thresholds to ensure operation in response to valid signals. Instrumentation in the dual frequency type of coding may be simplified since there are only two groups which may be segregated by means of high pass and low pass filters as shown in FIG. 5. Band elimination filters are preferred, however, since they allow the use of the full speech channel except the unwanted bands for talkoff protection.

The system described above employs signals which may be considered as a restricted two-out-of-eight code. The number of components chosen and total number of available components is not limited to this combination. For example, three components may be chosen out of three groups of four making up a total of twelve components for a restricted three-out-of-twelve code.

It is to be understood that the above-described arrangements are illustrative of the application of the principles of the invention. Numerous other arrangements may be devised by those skilled in the art without departing from the spirit and scope of the invention.

What is claimed is:

1. A signaling system comprising means for generating individual bursts of multifrequency signals, each of said individual bursts comprising a plurality of waves severally selected from separate groups of waves of disparate frequencies, a transmission medium, means for energizing said medium with said bursts, and a signal receiver coupled to said medium for sensing said bursts, said receiver comprising a plurality of band elimination filters, each filter being constructed to attenuate the waves of all but a selected one of said groups and to allow substantially unattenuated passage of all waves lying outside of the frequency range of said groups, a plurality of limiters severally coupled to each of said filters, individual frequency selective devices coupled to said limiters, each of said devices being adapted to produce an output indication in response to a wave characterized by a particular one of said disparate frequencies, and means for registering the presence of a burst when predetermined combinations of said devices produce output indications.

2. A signaling system comprising means for generating a plurality of groups of waves, each of said waves characterized by a frequency distinct from the frequency of every other wave, a transmission medium, means for connecting said generating means to introduce combinations of said waves severally representing distinct digit signals into said transmission medium, and a receiver adapted to detect digit signals propagating through said transmission medium, said receiver comprising band elimination filter means for separating said individual groups of waves and energy lying outside the frequency band characterized by the aggregate of said groups from the remaining of said groups, a plurality of limiters, each of said limiters coupled to a different one of said band elimination filters, individual frequency selective filters each being maximally responsive to a different one of said waves connected to said limiters, means for combining the outputs of said individual frequency selective filters, and means for indicating the presence of one of said distinct digits when the output of each filter of a predetermined combination of said frequency selective filters exceeds a fixed level.

3. The combination in accordance with claim 1 wherein said receiver includes an equalizer for enhancing the relative level of energy lying outside of the frequency band characterized by the aggregate of said groups with respect to the waves comprising said groups.

4. A telephone system comprising a telephone subscriber speech channel, means for generating a plurality of waves having mutually distinct voice frequencies, said plurality of waves being subdivided into predetermined groups, means for applying discrete combinations of said waves to said speech channel, each of said combinations being indicative of a singular digit, a receiver responsive to voice frequency waves propagating through said channel, said receiver including a plurality of band elimination filters for severally separating both individual ones of said waves and received interfering energy from the remainder of said waves, a plurality of limiters individually coupled to said filters, a plurality of frequency selective devices individually coupled to said limiters, each of said devices constructed to produce an output indication upon application of a different one of said waves, and means uniquely responsive to sets of said indications corresponding to said distinct combinations for registering the presence of said digits.

5. The combination in accordance with claim 4 wherein said generating means includes switching means for effecting the simultaneous application of a pair of said waves to said speech channel, each wave of said pair being selected from a separate one of said groups.

6. The combination in accordance with claim 5 wherein said switching means is operative to temporarily disconnect speech generating apparatus included in said speech channel.

7. In a multifrequency burst signaling system wherein bursts comprise individual components having frequencies lying within a predetermined signal frequency band, a signal receiver comprising filter means for segregating individual signal components from each other without separation from energy characterized by frequencies outside of the signal frequency band, individual limiter means associated with each of said signal components coupled to said filter means, a plurality of frequency selective devices severally connected to said limiter means, each of said devices being adapted to produce an output indication upon application of a mutually different one of said components having a magnitude exceeding a fixed level, and means responsive to predetermined concurrent combinations of said output indications for registering the presence of a burst.

8. The combination in accordance with claim 7 wherein said receiver includes an equalizer for enhancing the relative level of energy characterized by frequencies outside of said signal frequency band with respect to said components.

9. The combination in accordance with claim 8 wherein two components constitute a burst, and said filter means comprise high and low pass filters.

10. A selective signaling system comprising means for generating individual bursts of multifrequency signals, each of said individual bursts comprising a plurality of waves severally selected from separate groups of waves of different frequencies, a transmission medium, means for energizing said medium with said bursts, and a signal receiver coupled to said medium for sensing said bursts, said receiver comprising a plurality of signal selecting channels corresponding in number to the number of waves constituting said bursts, a band elimination filter connected in each of said channels, each of said filters being constructed to attenuate all but one of said groups of waves and to allow substantially unattenuated passage of both said one group of waves and all frequencies lying outside of said groups of waves, the unattenuated group of waves being different for each channel, limiter means disposed in each of said channels for suppressing signals of all frequencies in said channels relative to the strongest signal in each of said respective channels, individual frequency selective devices coupled to said limiter means, each of said devices being adapted to produce an output indication in response to a wave characterized by a particular one of said different frequencies, and means for registering the presence of a burst when predetermined combinations of said devices produce output indications.

11. The combination in accordance with claim 10 wherein said frequency selective devices include individual power amplifiers each having a sensitivity threshold approaching the level of the maximum power output of said limiter means.

12. The combination in accordance with claim 10 wherein said receiver includes an equalizer for enhancing the relative level of energy residing outside of the frequency band characterized by the aggregate of said groups.

13. The combination in accordance with claim 12 wherein the number of groups of said waves is two and said band elimination filter means comprises high and low pass filters.

References Cited in the file of this patent

UNITED STATES PATENTS

| | | |
|---|---|---|
| 1,476,003 | Martin | Dec. 4, 1923 |
| 2,139,135 | Rothert | Dec. 6, 1938 |
| 2,206,538 | Rhodes | July 2, 1940 |
| 2,672,603 | Cutler | Mar. 16, 1954 |
| 2,685,615 | Biddulph | Aug. 3, 1954 |
| 2,706,746 | Hullegard | Apr. 19, 1955 |

OTHER REFERENCES

Publication Electrical Engineering, November 1949, vol. 68, issue 11, page 927.

Publication Electronics, April 1954, pages 172–176.

Publication Electronics, June 1955, pages 156–160.